Dec. 1, 1964  W. W. MOUNT  3,159,554
SOLAR STILL WITH FLOATING WICK
Filed April 12, 1961
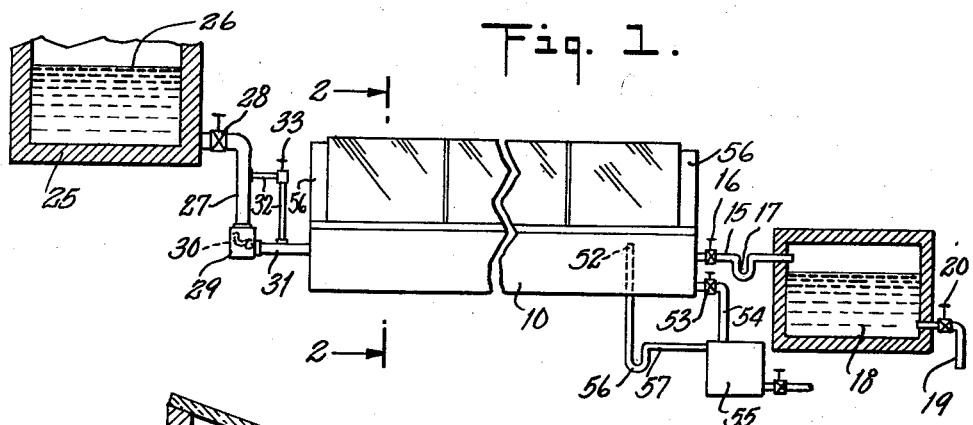
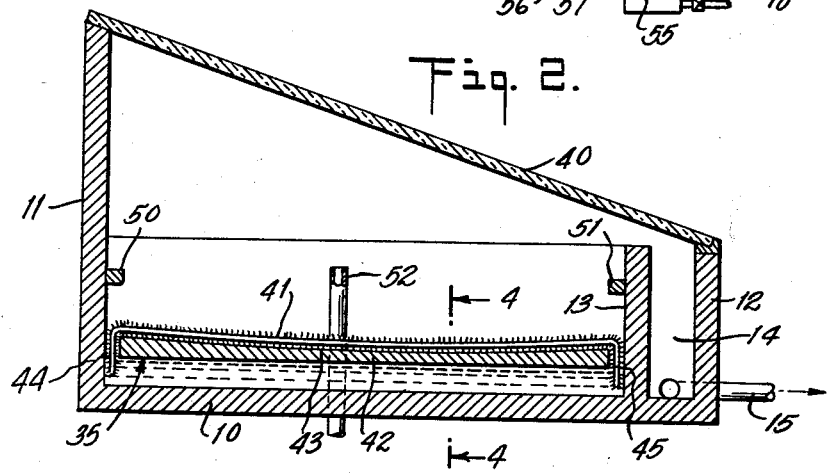
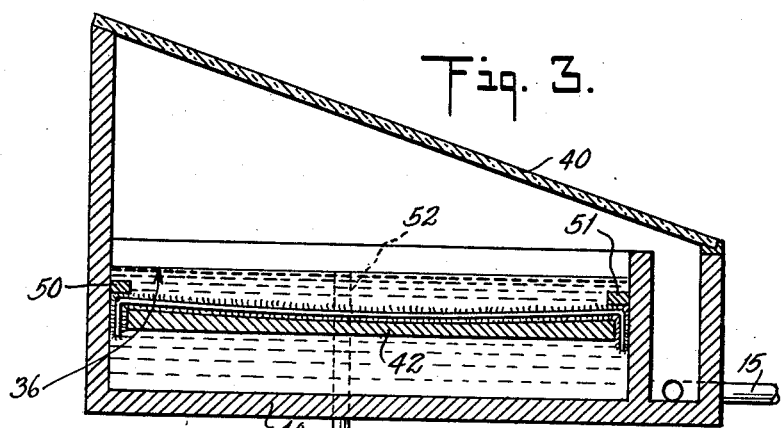
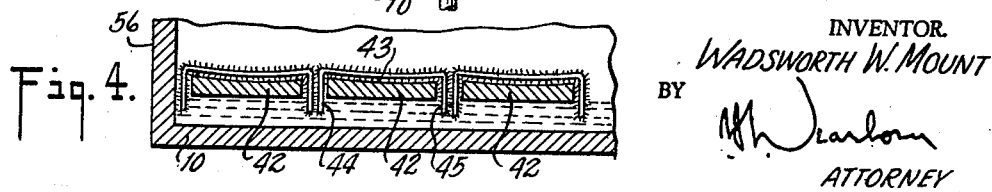
INVENTOR.
WADSWORTH W. MOUNT
BY
ATTORNEY न3,159,554
SOLAR STILL WITH FLOATING WICK
Wadsworth W. Mount, Warren Township, Somerset County, N.J., assignor of eight and thirty-three one-hundredths percent each to James L. Buckley, Aloise Buckley Heath, John W. Buckley, Priscilla L. Buckley, Jane Buckley Smith, William F. Buckley, Jr., Patricia Buckley Bozell, Fergus Reid Buckley, Maureen Buckley, and Carol Buckley Charlton; one and seven-tenths percent to Dean Reasoner; and fifteen percent to George M. Tisdale
Filed Apr. 12, 1961, Ser. No. 102,551
4 Claims. (Cl. 202—234)

This invention relates to new and useful improvements in the solar distillation of sea water and the like to produce fresh or relatively pure water. More specifically this invention relates to a solar still which embodies a spongy, black, absorbent mat adapted to be moistened with the water to be distilled and which is subjected to the direct rays of the sun through an inclined glass or other translucent sheet. The radiant heat of the sun evaporates the water from the mat so that the vapors rise and are condensed on the inner surface of the glass.

An important object of this invention is to improve the effectiveness of solar distillation equipment of this character by mounting the water absorbent mat on a float so that the mat rises and falls with any minor variations in the height of the water in the still.

Another object is to form the float which carries the mat with a slightly depressed or concave surface. The sides of the mat overhang the float and dip into the salt water in the still. It is found that the wicking action is greatly improved and accelerated by forming the top of the float as above indicated.

Still another object is to provide suitable stops or barriers which will prevent the float and the mat mounted thereon from rising beyond a certain height even if the water is carried to a substantially greater depth. In this way provision is made for periodically flushing the surface of the mat which tends to become encrusted with salt or impurities extracted as the pure water is distilled off.

Referring to the drawings:

FIG. 1 is a front elevation, partially in section, of a solar still which embodies this invention.

FIG. 2 is a sectional elevation taken on the line 2—2 of FIG. 1 with the float shown in a normal operating position with the salt water in the still at a shallow depth.

FIG. 3 is a sectional elevation corresponding to FIG. 2, in which the water is shown at a high level in the still with the float at its uppermost position against the stops.

FIG. 4 is a sectional elevation on the line 4—4 of FIG. 2 and shows the floats which are comparatively narrow and the overhanging mats which are thus more effective in carrying the water onto the entire upper surface of the mats on the floats.

Referring to the drawings, the still 10, which may be of indefinite length and substantially horizontal, has the form of a trough as clearly shown in FIGS. 2 and 3. The still has one wall 11, which is relatively tall, and a wall 12, which is relatively short. The trough, which contains the salt water or contaminated water to be distilled, is completed by an intermediate wall 13 preferably of approximately the same height as the wall 12 but spaced inwardly from it thereby forming a distilled water trough 14 having an outlet pipe 15 through which the distilled water is withdrawn.

The pipe 15, which is more clearly shown in FIG. 1, has a valve 16, a gooseneck 17 and discharges into a distilled water tank 18. From time to time distilled water may be withdrawn through pipe 19 by opening the normally closed valve 20. The salt water is fed from a supply tank 25 where it may have a layer of black oil 26 or the like on its surface in order to absorb heat from the sun and thus supply preheated water to the still 10. The normal path is through pipe 27 having control valve 28, a chamber 29 having a water level control float 30, thence through pipe 31 into the still. The box 29 and its float may be short-circuited by a by-pass line 32 in which is a control valve 33.

The float control valve 30 holds the water in the still at a normal level, which is indicated in FIG. 2 at 35.

When the still has been in operation for some time and it is desired to flush the still and wash the salt deposits or the like from the top of the mat, then in that case by-pass valve 33 is opened and the salt water is allowed to reach the upper level indicated at 36 in FIG. 3.

The still is completed by an inclined top 40 formed of glass or like material, the arrangement being such that the heat of the sun on the surface of the mat 41 causes the thin layer of water absorbed in the mat to vaporize. The vapors then are condensed on the underside of the glass 40 and flow downwardly and are discharged into the trough 14.

The mat 41 is of sufficient size to overhang the sides of a float 42 on which it is carried, as clearly shown in FIG. 4. The upper surface of the float is slightly dished or concave as indicated at 43 in FIGS. 2, 3, and 4. If the surface is absolutely level, it has been found that the wicking effect of the edges of the mat which hang downwardly into the salt water in the still, as shown at 44 and 45, causes the wick to become thoroughly wet near the edges of the float, but the wider the float the longer it takes to get, and keep, the central portions of the wick thoroughly wet. By making the top slightly concave, the wicking action at the edges of the mat pulls up water which flows down more rapidly toward the center section than it otherwise would, thus providing a more even and effective water feed to the entire mat at all times. I believe this takes place because the mat acting as a wick carries water over the edges of the float and, with a concave surface, water tends to flow inward.

The floats 42 carrying the mats 41 are riding on the salt water or other contaminated water to be distilled at its normal level, but when the top of the mat becomes encrusted with solid matter such as salt, which will be deposited as the water is evaporated, it then becomes desirable to raise the water level temporarily and wash off the encrustations.

This is accomplished by opening at intervals the valve 33 thereby allowing an abundance of salt water to flow into the still 10. In this way the depth of the water in the still is greatly increased, the floats 42 are carried from the position shown in FIG. 2 to the position shown in FIG. 3, where each of them is prevented from rising further by fixed stops 50 and 51. In this position, as shown in FIG. 3, there is a substantial body of water which then flows from one end of the still to the other and out a discharge outlet 52, through an air trap 56 and directly to waste through pipe 57 or into storage tank 55. This wash water has a much higher salt content and therefore should normally not be reused but should be discharged and wasted.

As soon as the encrustations have been washed off the mat 41, the valve 33 is closed and the water level is brought back to normal either by evaporation or by temporarily opening valve 53 for the withdrawal of the water from the still through pipe 54 into the storage tank 55.

It will be observed, as clearly illustrated in the drawings, that the absorbent mats do not rest on the surface of the salt water or the like to be distilled but are carried on floats which support the mats above the body of water to be distilled. This has a marked advantage in preventing the heat in the mat from being dissipated downwardly into the body of water which is usually at low temperature. It will be understood that while the slightly dished or concave upper surface of the float is preferable, it is not essential to the operation of this invention.

If it is desired to accumulate concentrated brine for other uses, the still may be filled with salt water available as raw material to any depth up to the point where the evaporator mat is just above water when the floats are restrained by the stops 50 and 51, then when the water drops to a lower level due to evaporation, the concentrate may be withdrawn through valve 53 into the tank 55 and then used as desired.

The still is completely closed at its ends in any suitable way, as by end walls 56, so that outside air does not influence the internal temperature or the action of the still.

It will be understood that two units such as shown in the drawings may be mounted back to back, as for example with the tall walls 11 together and the transparent sheets sloping in opposite directions, or the troughs 10 may be placed adjacent with the transparent plates 40 supported at the center or ridge pole in which case both walls of each trough 10 may be of equal height.

In fact, a single wide trough with two partitions, one on each side, may be provided with transparent plates forming a shed so that condensate from one side would flow into one distilled water trough and condensate from the other side would flow into the other distilled water trough.

Many other variants will occur to those familiar with this art, and only such limitations should be imposed as are indicated in the appended claims.

I claim:

1. A solar still which comprises a substantially horizontal primary trough closed at the bottom and at its respective ends, said still having a tall side wall on one side and a short side wall on the opposite side and a partition near the short side wall forming a secondary trough or channel for distilled water, a sheet of rigid translucent material mounted on said tall and short side walls in an inclined position whereby the still is closed by said rigid sheet, a source of salt or other contaminated water to be distilled, connected to supply salt water to the primary trough of the still, means for automatically maintaining the salt water at a predetermined low level, a float largely covering the bottom of the still and floating on the salt water therein, a mat of water absorbent material mounted on the float and extending over its edges and dipping into the water in the bottom of the still to keep the mat moistened with salt water by wicking action, an overflow to permit the salt water to reach a high level in the still for the purpose of washing the mat without overflowing into the secondary distilled water trough, means for limiting the upward movement of the float arranged to permit large quantities of water to flow over the mat on the float during the washing period, and means for withdrawing distilled water from the secondary trough into which flows condensate from the underside of the translucent top sheet.

2. A solar still which comprises a substantially longitudinal trough closed at its respective ends, a glass top adapted to condense vapors rising from the still, at least one float having a slightly concave upper surface and mounted to largely cover the surface of the salt water in the still, a water absorbent mat on the float and overhanging at the edges of the float into the salt water whereby the mat is kept wet by wicking action without flooding.

3. A solar still comprising a substantially horizontal trough, long relative to its width, and having a bottom, a tall wall on one side, a short wall on the opposite side, a partition spaced from the short wall and forming a distilled water channel and ends for completing the box-like structure of the still, an inclined glass cover resting on the tall and short walls and completely sealing the still, a plurality of floats in the main channel of the still and largely covering the surface of the salt water therein, liquid absorbent mats mounted on each float and wicking means connected to the mat and extending downwardly into the salt water in the still, means on the walls of the still for limiting the upward movement of the floats regardless of the salt water level in the still, an outlet near the top of the still at one end for preventing the salt water from overflowing into the distilled water channel, means for withdrawing condensed water from the distilled water channel, automatic means for maintaining during the normal operation of the still a low liquid level so as to maintain a predetermined amount of salt water at the bottom, and means independent of said automatic means for periodically raising the water level of the still to the overflow for the purpose of washing off solid matter from the exposed surface of the mat.

4. A solar still as in claim 3, in which the float has a slightly dished or concave top surface, and a liquid absorbing mat covering the entire top surface of each float and extending beyond the edges of the float and down into the salt water in the still.

References Cited by the Examiner

UNITED STATES PATENTS 2,412,466  12/46  Miller.

FOREIGN PATENTS 820,705  11/37  France.
164,679  8/55  Australia.

NORMAN YUDKOFF, *Primary Examiner.*

ALPHONSO SULLIVAN, *Examiner.*